Nov. 8, 1932.   G. C. HENNESY   1,887,055
ELECTRIC MACHINE
Filed March 26, 1926   2 Sheets-Sheet 1

Inventor
Gerald Craft Hennesy

Nov. 8, 1932.    G. C. HENNESY    1,887,055
ELECTRIC MACHINE
Filed March 26, 1926    2 Sheets-Sheet 2
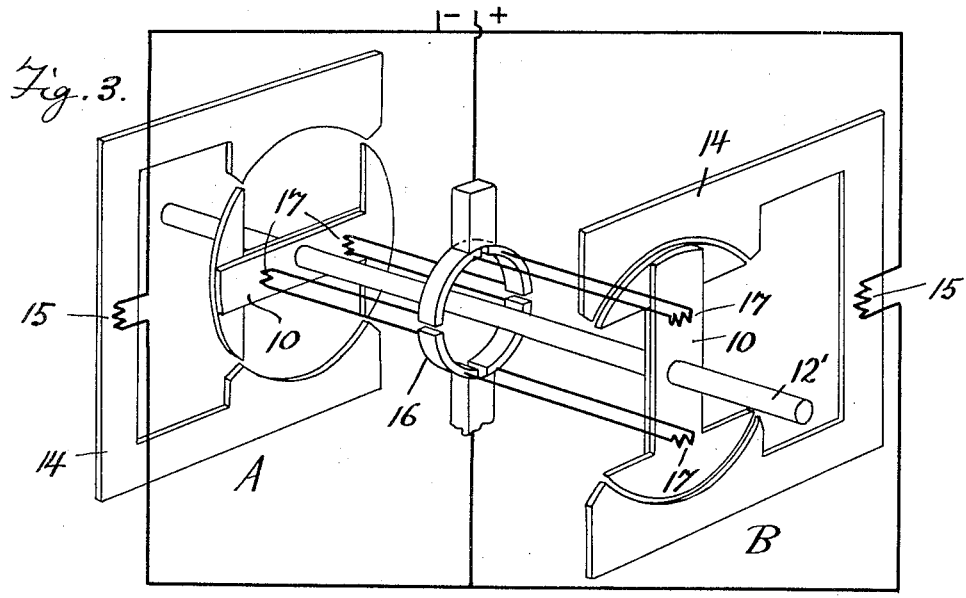
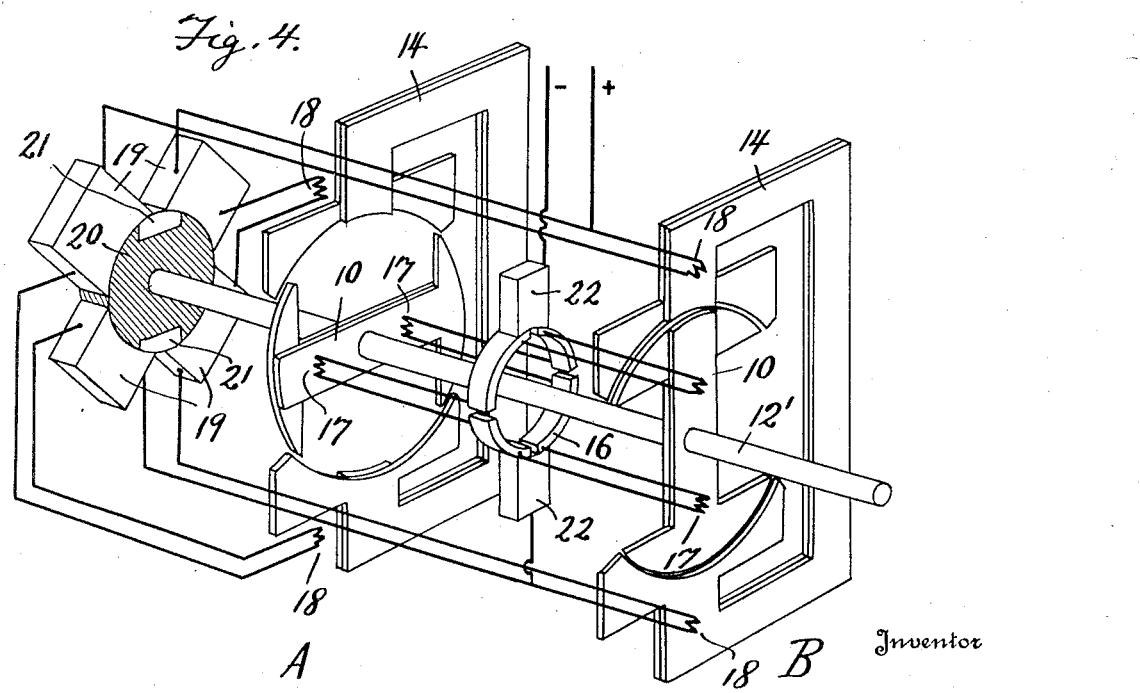
Inventor
Gerald Craft Hennesy Patented Nov. 8, 1932

1,887,055

UNITED STATES PATENT OFFICE

GERALD CRAFT HENNESY, OF WASHINGTON, DISTRICT OF COLUMBIA

ELECTRIC MACHINE

Application filed March 26, 1926. Serial No. 97,631.

My invention relates to electric machines and more particularly to dynamos, motors and converters, although I have shown and described my invention as a small motor, I do not wish to be limited to this field as there are many uses in the electrical arts where I contemplate applying the principles of my invention.

The primary object of my invention is to improve the efficiency of motors and dynamos.

Another object is to provide an electric motor which will operate efficiently on direct or alternating current.

Another object is to provide an electric motor which will operate in synchronism with single phase alternating current.

Another object is to provide a motor in which the armature and field are of the same strength.

Another object is to equalize the magnetic circuits when the current is being reversed in the armature.

Another object is to provide a motor which may be connected either in series or shunt with direct or alternating current.

Another object is to reduce sparking at the brushes.

Other objects and advantages will become apparent as I describe my invention.

Figure 3 is a diagrammatic view of a different form of my invention.

Figure 4 is a diagrammatic view of still another form of my invention.

In this description similar reference characters indicate corresponding parts through the several views.

Figure 1:
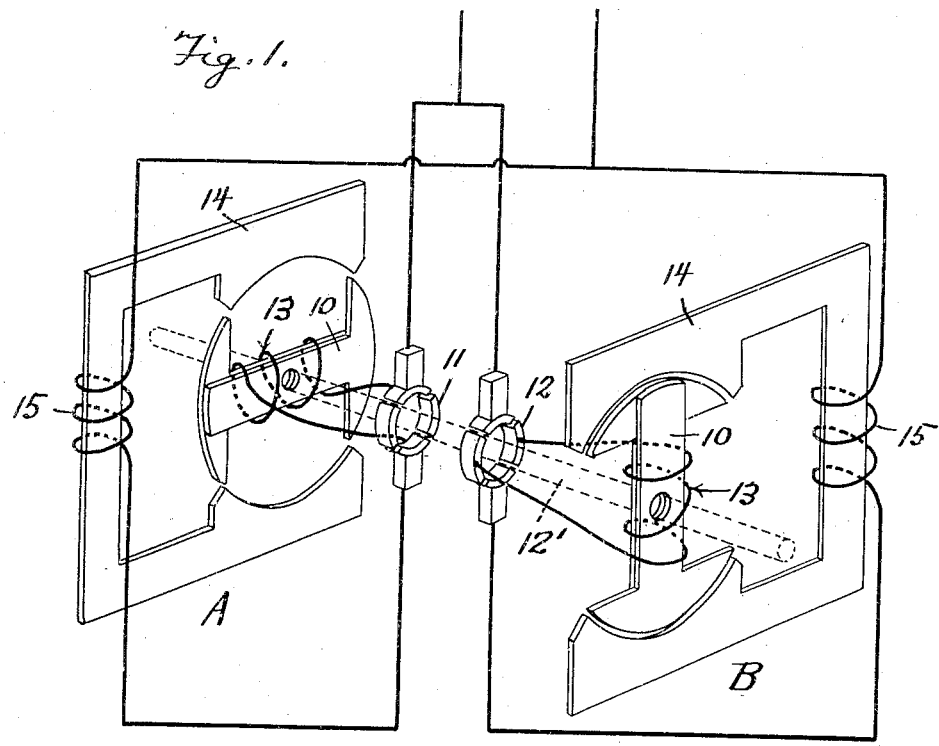
Figure 1 is a diagrammatic illustration of the elements of one form of my invention.

The armature consists of two shuttle or H-shaped armature cores 10 which are constructed of T-shaped laminæ as clearly shown in the drawings.

That portion of the armature core 10 between the enlarged pole pieces has the same magnetic reluctance as the corresponding portion of the field core 14.

In the form of my invention shown in Figure 1, I mount two four segment commutators 11 and 12 on the shaft 12' between the armature cores 10. Each armature core 10 has a winding 13 which is connected to diametrically opposed segments of the commutators 11 and 12. Cooperating magnetically with each armature magnet is a field core 14 which has a winding 15.

The motor shown in Figure 1 is simply two single series motors A and B connected in parallel, and it is clearly shown how when one motor is disconnected the other is operating.

Figure 2:
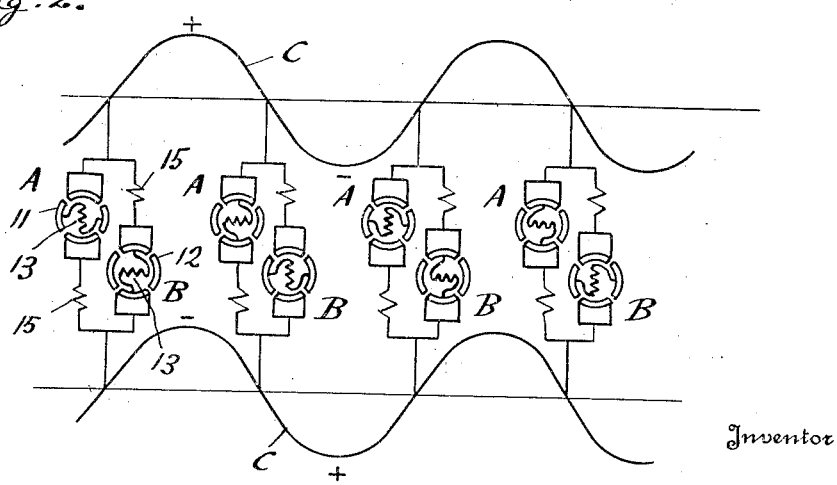
Figure 2 is a diagrammatic view of one form of my invention showing how the motor runs in synchronism with alternating current.

Figure 2 shows how, when the motor is operating at 1800 R. P. M. on a 60 cycle alternating current source, when the motor A is being disconnected the current in the line is at a minimum, and the motor B during the next quarter turn will make use of the maximum current shown by the sine curves C, thus reducing the sparking and at the same time operating at the highest efficiency.

In Figure 3, the arrangement is substantially the same as Figure 1, that is, two motors A and B. I use one commutator 16 but each armature core 10 has two windings 17 which are connected across the commutator, as is common practice in drum wound armatures.

The winding on each armature magnet 10 provides the same electromagnetic strength as the field magnet 14 with which it cooperates, this is untrue only during the time of commutation.

One disadvantage of the motor shown in Figure 3 is that while one half of the armature is short circuited, as the armature in motor B, the current in the field magnet of the motor B is increased and causes heating and inefficiency. To overcome this I have devised the motor shown in Figure 4.

This motor is similar to Figure 3 except that I use four field windings 18. These are connected across four brushes 19 which bear on the insulation disc 20 mounted on the shaft. The disc 20 has two short circuiting bars 21 of the same chord as the brushes 22.

The windings 18 of the field are of the same ampere turns as the windings 17 of the armature, which insures that the electromagnetic strength of the armature magnet is the same as the field magnet with which it co-operates.

From a study of Figure 4 it can be seen that when the armature in motor B is short circuited and the armature coils in motor A are in parallel, field coils in motor B will also be short circuited, while the field coils in motor A will be in parallel.

From the foregoing it will be seen that I have provided a motor which is more efficient than the usual motor, and one which is capable of many uses.

I do not wish to be limited to the exact arrangement shown in the drawings, as the uses to which my motor will be put will necessitate many modifications without departing from the spirit of my invention.

What I claim is:—

1. An electric machine comprising an armature, said armature consisting of a plurality of magnetically separate armature magnets mounted on a shaft, means to cyclically short circuit the armature magnets and change the direction of current therein, field magnets associated with said armature magnets to form a plurality of magnetically separate couples, each couple consisting of one armature magnet co-operating with only one field magnet, means to short circuit the field magnets in synchronism with the short circuiting of the armature magnets.

2. An electric machine comprising a plurality of armature magnets mounted on a shaft, field magnets associated with said armature magnets to form a plurality of couples, each couple consisting of one armature magnet co-operating with only one field magnet, the magnetic circuit of the armature magnet of each couple being separate from the magnetic circuit of the armature magnet or magnets of the other couple or couples, means to cyclically change the direction of current in the armature magnets, the direction of current being changed in the armature magnet of one couple without affecting the direction of current in the armature magnet or magnets of the other couple or couples.

In testimony whereof I affix my signature.

GERALD CRAFT HENNESY.